United States Patent Office 3,329,852
Patented July 4, 1967

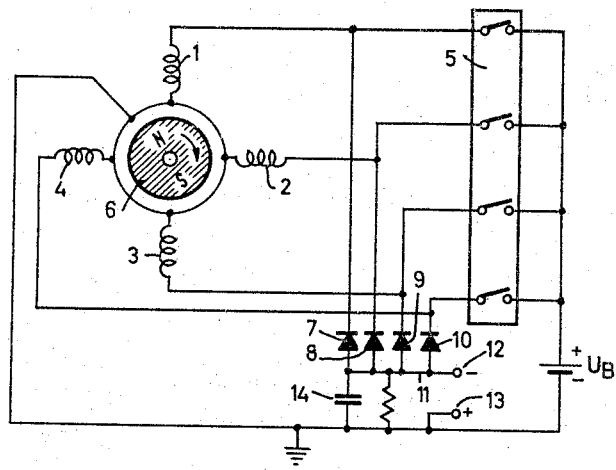
FIG. 1
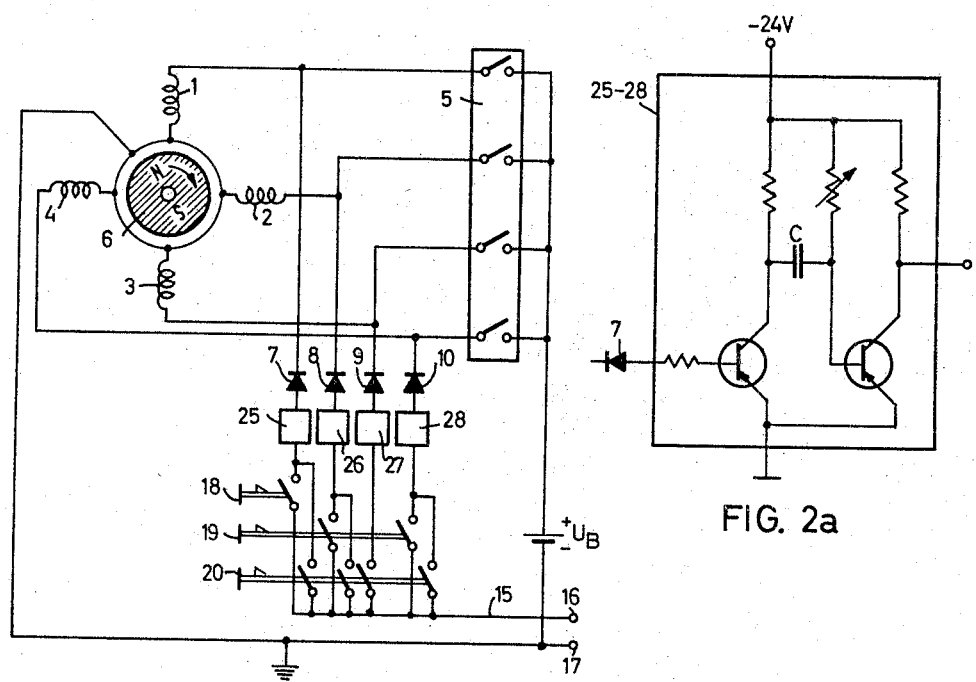
FIG. 2
FIG. 2a

3,329,852
DIRECT-CURRENT MOTOR WITH PERMANENT-MAGNET ROTOR AND SEQUENTIALLY ENERGIZED STATOR WINDINGS
Günter Saussele and Karlheinz Menzel, Nurnberg, Germany, assignors to Siemens-Schuckertwerke Aktiengesellschaft, Erlangen, Germany, a corporation of Germany
Filed July 29, 1964, Ser. No. 385,927
Claims priority, application Germany, Aug. 1, 1963, S 86,477
6 Claims. (Cl. 318—138)

Our invention relates to electric motor circuits comprising a direct-current motor, preferably of the fractional horsepower or midget type, having a permanent-magnet rotor and stator windings which are sequentially energized by direct current to produce a rotating field.

In electric drive systems, particularly those operating at controllable or regulatable speed, it is often necessary to precisely ascertain at any moment the instantaneous motor speed. Various methods and devices have become known for performing continuous speed measuring operations. The most common methods require coupling with the driven machine shaft a tachometer generator furnishing an output voltage proportional to the speed of rotation. Another known way is to couple a pulse transmitter or pulse generator with the machine shaft which issues one or several pulses per rotation of the shaft. In each such case, additional devices or dynamo electric machines are needed that must be mechanically connected with the shaft whose speed is to be indicated.

Other problems of control engineering require ascertaining at any moment the angular position of the rotor. This is the case, for example, in electric drives used for controlling or regulating an angular displacement, as well as for direct-current motors which do not possess a rotating commutator of the mechanical switch type but are equipped with external circuitry that require rotor-positional signals for a proper sequence control of the energizing currents which produce the rotating field of the motor.

It is an object of our invention to provide a motor circuit which inherently is capable of furnishing a speed or position responsive output signal and thereby eliminates the need for any auxiliaries coupled with the driven shaft or added to the motor structure proper.

According to our invention, this object is achieved in a particularly simple and reliable manner with direct-current motors of the type having a permanent-magnet motor and a number of peripherally distributed stator windings which, for producing a rotating field, are sequentially energized with direct-current.

More specifically, according to our invention, the voltage which in each individual winding is induced by rotation of the rotor during the period of time in which no energizing direct voltage is supplied, is employed for furnishing an analog and/or digital output signal indicative of the rotating speed and/or the instantaneous rotor position. This induced voltage has during the unenergized period of energization in each winding, a polarity opposed to that of the normal energizing voltage supplied from the power source. In other words, for furnishing the desired output signal, we take advantage, according to the invention, of the voltage which the rotor induces in the stator windings during the periods of time in which the respective windings are not traversed by energizing current from the power supply.

According to another feature of our invention, we connect to the stator windings of the motor respective rectifiers which couple the half-waves of the induced counter voltage, having a polarity opposed to the feeder voltage, out of the stator circuit and pass it into a signal output circuit. The rectified voltage thus coupled out of the stator circuit is then available for furnishing a direct voltage proportional to speed, or it is passed through electronic pulse transformers to furnish respective sequences of output pulses which are digitally proportional to the rotor speed. If the individual voltages induced in the stator windings are separately processed, the output signals further permit the providing of information as to the instantaneous rotor position. This is of considerable advantage, for example, when employing the converted output signals for the control of electronic commutating devices.

For further describing the invention, reference is made to embodiments of motor circuits according to this invention, schematically illustrated, by way of example in the accompanying drawings, in which:

FIG. 1 shows a circuit diagram for providing an output voltage proportional to the rotating speed of the motor.

FIG. 2 is a circuit diagram suitable for providing an output signal constituted by pulse sequences proportional to the motor speed.

FIG. 2a is a circuit diagram of a pulse converter which may be utilized as each of the pulse converters 25, 26, 27 and 28 of FIG. 2.

The same reference numerals are employed for all of the illustrated embodiments with respect to corresponding components respectively.

Figure 3:
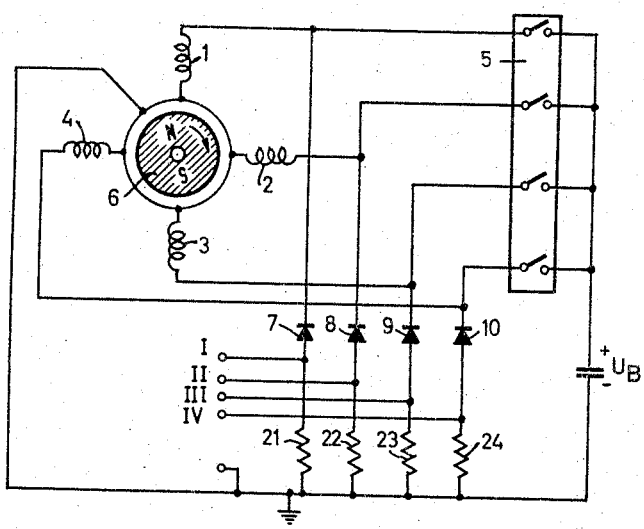
FIG. 3 is a circuit diagram in which the voltages induced in the stator windings are separately used for providing signals indicative of the instantaneous rotor position.

Referring to FIG. 1, the illustrated direct current motor is of the midget type. It is provided with four stator windings 1, 2, 3 and 4 in star point connection. The star point is connected to the negative pole of the current supply, here schematically illustrated by a voltage source $U_B$. A commutating device 5, consisting for example of a mechanical commutator or an electronic commutating device devoid of mechanical switching contacts, energizes the individual stator windings 1, 2, 3 and 4 in sequence so so that a rotating field is produced in the motor. A particular design and operation of the commutating device is not essential to the present invention proper so that further details are not illustrated and described herein. If desired, however, reference with respect to electronic commutation may be had to the copending application Ser. No. 385,900, now Patent No. 3,304,481 of G. Saussele, filed concurrently herewith.

The illustrated motor is further equipped with a two-pole permanent-magnet rotor which is diametrically polarized, the poles being denoted by N and S. The rotating field causes the rotor to rotate in synchronism with the field.

The present invention takes advantage of the fact that the rotating permanent-magnet rotor induces in the individual stator windings an approximately sinusoidal voltage. The negative half-waves of these induced voltages can be coupled out of the energizing motor circuit with the aid of semiconductor diodes 7, 8, 9 and 10, for example. The individual diodes then furnish in their respective output leads the four voltages represented by full lines in the four superimposed graphs shown in FIG. 5. In these graphs, the abscissa denotes the rotational angle for a single full rotation, and the ordinate represents the amplitude of the induced voltage. The graphs I, II, III and IV relate to the voltages induced in the stator windings 1, 2, 3 and 4, respectively.

As will be seen in FIG. 1, the rectified output voltages from the diodes 7, 8, 9 and 10 are added by means of a common output lead 11 which is connected to a negative output terminal 12. A positive output terminal 13 is connected with the star point of the motor which, as shown, is preferably at zero (grounded) potential. The system thus provides between the output terminals 12 and 13 a direct voltage whose magnitude is proportional to the motor speed. If desired, the output voltage can be smoothed by means of a capacitor 14 and a parallel connected resistor or inductance coil. The output voltage can be derived from FIG. 5 by adding the individually induced voltages represented by full lines.

In the motor circuit shown in FIG. 2, the counter voltages induced in the stator windings are converted to speed-proportional pulses. The induced voltages, coupled out of the motor energizing circuit with the aid of diodes 7 to 10 in the same manner as described above with reference to FIG. 1, are supplied to pulse converters 25 to 28 respectively. The output leads of the respective pulse converters are connected, under control by selectively operable switches, with a common summing lead 15 attached to an output terminal 16, the other output terminal 17 being connected with the star point of the field windings. By the summation of the pulses sequentially issuing from the four pulse converters 25, 26, 27 and 28, the output terminals 16, 17 furnish a total of four pulses per rotation of the rotor when the switch 20 is closed. It is sometimes desirable to vary the number of pulses issuing per rotation. This can be done by selectively operating another one of the push-button switches 18, 19, 20, which may be interlocked in the conventional manner to permit actuation of only one of the push-buttons at a time. When the push-button switch 18 is depressed, only one pulse from the pulse converter 25 is issued at terminals 16, 17 per rotation. When the push-button 19 is depressed, two pulses per rotation are issued. It will be apparent that the conversion of the output signal to pulses in the described manner permits employing the output signal for digital control or other digital processing. The pulse converter may comprise any suitable known pulse converter. A suitable pulse converter comprises that shown in FIG. 2a.

According to the circuit shown in FIG. 3, the voltages induced in the stator windings by rotation of the permanent-magnet rotor 6 may also be processed separately from each other. The diodes 7 to 10, corresponding to those in FIGS. 1 and 2, are connected through respective resistors 21, 22, 23 and 24 with the negative pole of the current supply. The output terminals I, II, III and IV then furnish individual voltages as shown at I, II, III and IV in FIG. 5.

Figure 4:
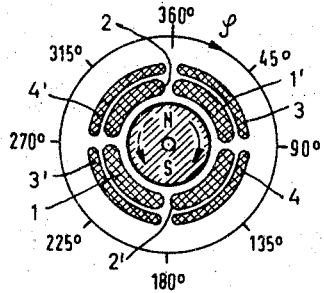
FIG. 4 illustrates schematically an arrangement of the stator windings applicable in motors as shown in FIGS. 1, 2 and 3.
Figure 5:
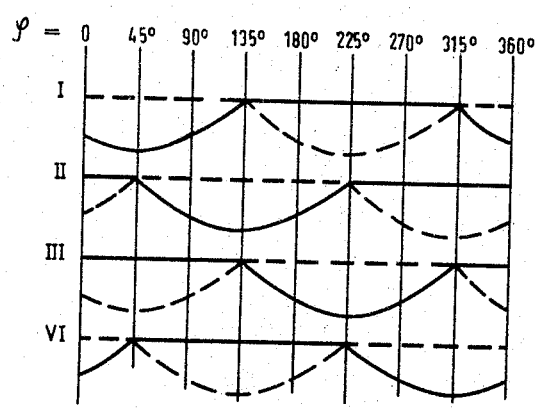
FIG. 5 is an explanatory diagram representing the sinusoidal half waves of voltages occurring at the output terminals of a circuit according to FIG. 1, and which are dependent upon the angle of rotation.

The arrangement of the above-mentioned stator windings in the motors according to FIGS. 1, 2 and 3 may correspond to that of FIG. 4. The winding 1 is shown composed of two portions denoted by 1 and 1' in FIG. 4. The other windings, analogously, are composed of portions 2 and 2', 3 and 3', 4 and 4'. The rotation of the permanent-magnet rotor is indicated by arrows. The full-line arrow denotes the reverse rotation. The counter voltages induced in the stator windings during reverse rotation are indicated in FIG. 5 by broken lines. The polarity of the counter voltages remains opposed to that of the supply voltage $U_B$.

To those skilled in the art, it will be obvious upon a study of this disclosure, that with respect to motor design and circuitry, our invention permits of various modifications and hence can be given embodiments other than particularly illustrated and described herein, without departing from the essential features of our invention and within the scope of the claims annexed hereto.

We claim:
1. An electric motor circuit, comprising a direct-current motor having a magnetic rotor and stator windings, direct-current supply means, sequential switching means connecting each of said stator windings in sequential relation with said supply means during intermittent active intervals of time, voltage-responsive circuit means connected to said stator windings for response to voltages induced in each of said windings between said active intervals by said rotor, said voltage-responsive circuit means including diodes connected to said stator windings and poled in blocking direction relative to said supply means so as to pass only the opposed-polarity half-waves of said induced voltages, and an output lead connected to said diodes for providing an output signal dependent upon the speed of rotation of said rotor.

2. An electric motor circuit as claimed in claim 1, wherein said stator windings are connected to a star point in common, said diodes are connected to said windings at respective points remote from said star point, and an output terminal is connected to said star point in a manner whereby the output signal appears between said output terminal and said output lead.

3. An electric motor circuit as claimed in claim 1, wherein said voltage-responsive circuit means comprises a plurality of selectively actuable switches interposed between said diodes and said output lead for selectively providing signals from one and more stator windings.

4. An electric motor circuit as claimed in claim 1, wherein said voltage-responsive circuit means comprises a plurality of pulse converters each interposed between a corresponding one of said diodes and said output lead whereby the output signal is formed by pulse sequences.

5. An electric motor circuit as claimed in claim 1, wherein said voltage-responsive circuit means comprises a plurality of pulse converters each interposed between a corresponding one of said diodes and said output lead and a plurality of selectively actuable switches each connected between a corresponding one of said diodes and said output lead in a manner whereby said output signal is formed by a selective number of pulses per rotation of said rotor.

6. An electric motor circuit, comprising a direct-current motor having a permanent-magnet rotor and star point connected stator windings, direct-current supply means, sequential switching means connecting each of said stator windings in sequential relation with said supply means during intermittent active intervals of time, voltage-responsive means connected to said stator windings for response to voltages induced in each of said windings between said active intervals by said rotor, said voltage-responsive circuit means including diodes having outputs and inputs connected to said stator windings at their ends remote from the star point and poled in blocking direction relative to said direct current-supply means so as to pass only half-waves of said induced voltages of opposite polarity, and a resultant voltage lead connected to the output of each of said diodes to provide between said star point and said resultant voltage lead a direct voltage output signal having a magnitude proportional to the rotor speed.

References Cited
UNITED STATES PATENTS

| | | | |
|---|---|---|---|
| 2,814,769 | 11/1957 | Williams | 318—138 X |
| 2,905,876 | 9/1959 | Hillman | 318—33 X |
| 2,993,160 | 7/1961 | Soredal | 318—326 X |
| 3,189,808 | 6/1965 | Henry-Bandot | 318—138 |

ORIS L. RADER, *Primary Examiner.*

G. SIMMONS, *Assistant Examiner.*